United States Patent Office 3,512,359
Patented May 19, 1970

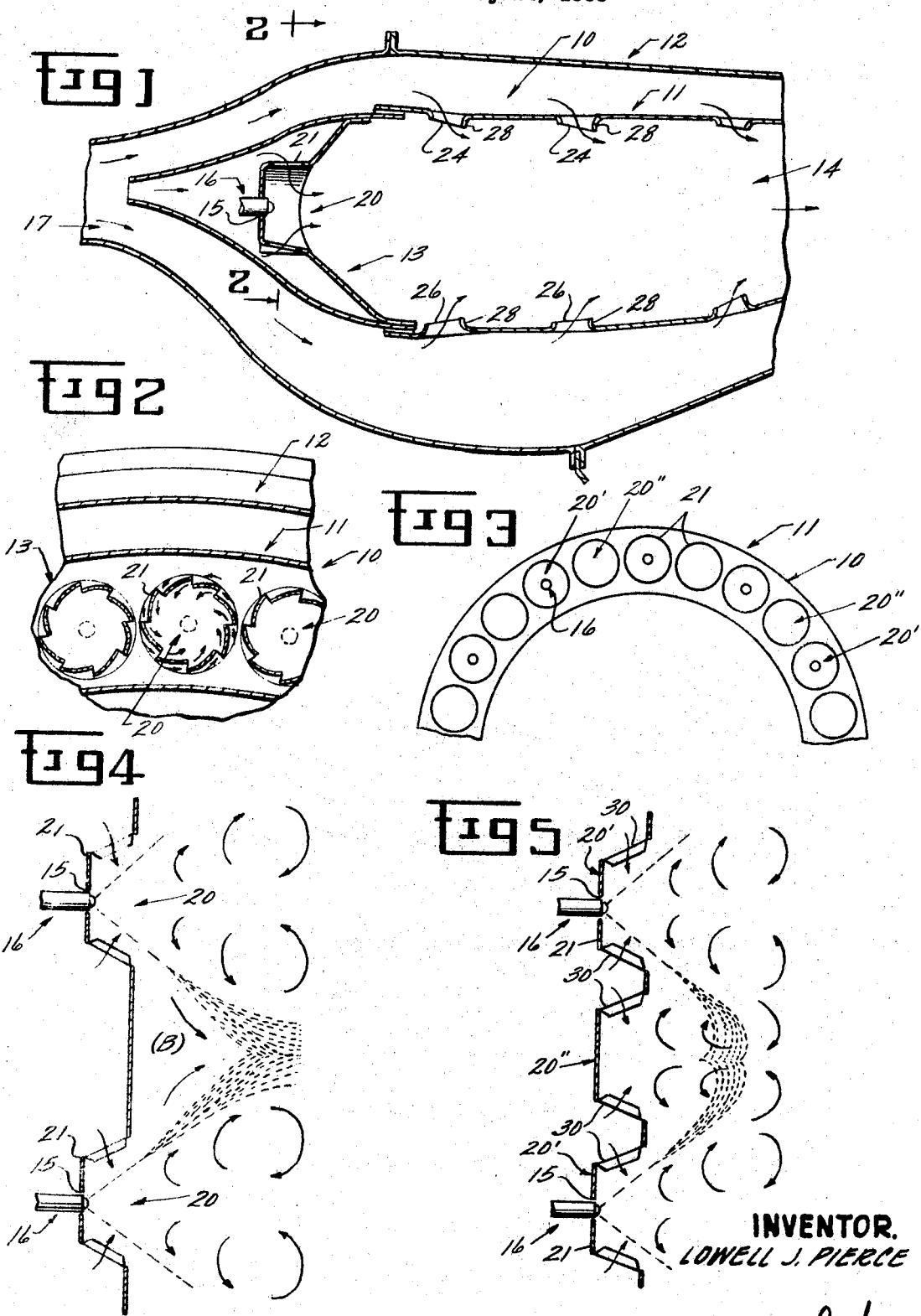

3,512,359
DUMMY SWIRL CUP COMBUSTION CHAMBER
Lowell Jackson Pierce, Melrose, Mass., assignor to General Electric Company, a corporation of New York
Filed May 24, 1968, Ser. No. 731,803
Int. Cl. F02c 3/00
U.S. Cl. 60—39.74          4 Claims

ABSTRACT OF THE DISCLOSURE

An annular combustion chamber including a plurality of vortex air admission generators, wherein some of said generators include fuel nozzles for controlling combustion within the combustion chamber.

BACKGROUND OF THE INVENTION

Field of the invention

This invention relates generally to an apparatus for efficiently burning fuel in a jet engine combustion chamber which utilizes a vortex air admission for establishing discrete air flow patterns and for controlling combustion within these patterns. Specifically, the invention comprises an annular combustion chamber having a circumferential row of vortex air admission generators in the closed end thereof. Fuel is introduced into some but not all of the vortices while a limited amount of air to commence ignition is introduced into all of the vortices. The remaining air necessary for combustion is introduced through perforations in the annular combustion chamber. The arrangement provides an air flow and combustion pattern which includes a film of cooling air adjacent the walls of an annular combustion chamber, and a controlled pattern of burning fuel air mixture about a central low pressure core developed by the vortex generators.

Description of the prior art

A combination chamber, especially for jet engine application or other high speed flight applications, is subject to different environmental conditions and, thus, must overcome various problems associated with these conditions. For example, such a combustion chamber is generally positioned within a fast moving gas stream and must provide not only ignition of fuel in such a fast moving gas stream, but also continuation of the combustion process and full combustion of the fuel in a relatively short period of transit time.

With the advent of still higher jet flight speeds, and the desire for more power output per unit volume of combustion chamber, substantial efforts are being expended to provide such economical operations. However, basic features of air delivery and fuel combustion become more complicated because of the necessity of providing more air in the combustion chamber at higher velocities while still attempting to provide optimum ignition combustion and cooling characteristics. This, in turn, requires control of the incoming air through regulated air patterns and areas of low velocity. An annular combustion chamber as described herein will provide far more combustion volume than an equivalent can arrangement, but air ignition and general combustion control is more difficult because there is less area to provide air ignition and far more interference to discrete air flow patterns and combustion processes.

In solving some of the problems associated with air ignition and controlled combustion, your attention is directed to U.S. Pat. No. 3,134,229 which issued on May 26, 1964, and to FIGS. 1, 2 and 4 of the attached drawings. In order to provide better mixing, burning, and combustion control in an annular combustion chamber, the Johnson patent provided an annular combustion chamber having a circumferential row of vortex air generators at the closed end as shown in FIG. 2. Fuel was introduced into all of the vortices and mixed with a limited amount of air in order to commence ignition, obtaining the remaining air necessary for combustion through perforations in the chamber. Your attention is directed to FIG. 2 which is an attempt to show the prior art and the problems associated therewith. Specifically, FIG. 2 discloses a sectional and elevated view of an annular combustion chamber having a plurality of voretx generators 20 positioned in the head end of the liner 11 in equidistant relationship about the periphery thereof. A preferred fuel delivery in this arrangement is by means of a fuel nozzle 16 in each opening 15 for each generator 20. The fuel nozzle 16 may be of any well known type in the art to deliver a conical spray of fuel axially into the combustion chamber. In a high air velocity burner where transit time is reduced, rapid fuel-air mixing must take place together with a high rate of combustion near the head of the combustion chamber. Fuel injection into the vortical movement of the air from the vortex generators causes fuel particles to be taken out by the vortical movement of air for mixing and distribution throughout the turbulent whirling air mass. Ignition of the fuel is commenced by well known ignition devices such as sparking devices placed generally within the vicinity of the closed end. However, after careful study, it has been found that in between the swirl cups and removed from the swirl cups' field of influence, the air flow is forced downstream. This portion of the flow as disclosed in FIG. 4 by letter "B" contains a high percentage of raw fuel which has not been adequately mixed with recirculated gases. As a consequence a portion of the fuel passes out of the combustor without burning. Accordingly, this gives rise to poor combustion efficiency, an uneven temperature profile, high dome metal temperatures and high peak temperature factors.

Summary of the invention

As a result of the deficiencies noted above, the combustion chamber, as disclosed in the Johnson patent, does not burn the fuel entering the combustion chamber for maximum combustion efficiency. The present invention obviates some of the prior art deficiencies and is capable of adequately mixing the air flow with the fuel thereby controlling the air flow pattern developed within the burner for an efficient operation.

In the preferred embodiment disclosed herein, the invention relates to an annular combustion chamber around which a circumferential row of vortex air admission generators is placed. In order to insure maximum mixing of the air with the fuel and to control the air flow pattern developed within the burner, fuel is introduced into only a portion of all the vortices provided. The vortices, which do not have contained therein a fuel nozzle, act primarily as a control and mixing device for controlling the air flow pattern found within the burner in order to insure maximum mixing of the air with the fuel.

Accordingly, it is the object of this invention to provide a plurality of air admission vortex generators within an annular combustion chamber wherein better mixing, burning and combustion control is provided.

Another object of this invention is to provide a combination of controlled air flow patterns and combustion process within a combustion chamber.

These and other objects, advantages, and features of the subject invention will hereinafter appear and, for purposes of illustration, but not of limitation, an exemplary embodiment of the subject invention is shown in the appended drawing.

Brief description of the drawing

FIG. 1 is a cross-sectional view, partial, of a preferred embodiment of an annular combustion chamber utilizing a vortical generator therein;

FIG. 2 is a partial elevational and cross-sectional view of the combustion chamber of FIG. 1 taken under line 2—2, which depicts the arrangement of the prior art;

FIG. 3 is a partial elevational and cross-sectional view of the combustion chamber of FIG. 1 taken under line 2—2, depecting the preferred embodiment of the invention;

FIG. 4 is a cross-sectional view, partial, of the circumferential row of vortex air generators, as shown in the prior art;

FIG. 5 is a partial cross-sectional view of a circumferential row of vortex air generators of the preferred embodiment.

Description of the preferred embodiment

Referring first to FIG. 1, there is illustrated an annular combustion chamber 10 which generally includes a perforated annular lining 11 positioned concentrically within an annular casing 12. Annular lining 11 includes a closed head end 13 in an open exhaust end 14 and is positioned so that air flow through casing 12 moves from the head end 13 of liner 11 to exhaust end 14. Head end 13 includes a circumferential row of vortices 20 some of which have fuel injection nozzle openings 15 to receive fuel nozzles 16 for supplying fuel to the chamber. Passageway 17 receives air from a compressor (not shown) which passes into the perforated liner for mixing with the fuel.

The vortex generator 20 comprises a cup-shaped body or shell 21 broadly speaking, vortex generators are known in the art and they take various forms such as the body 21 being conical, frustro-conical, or spherical, etc., and plain, curved or dished vanes may extend therefrom. The importance given to the vortical generator is directed to its location and use rather than to a specific structure.

Referring to FIG. 3 a plurality of vortex generators 20 are positioned in the head end of line 11 in equidistant relationship about the periphery thereof. Placed within some of the vortex generators 20 in an alternate arrangement are fuel nozzles 16. The fuel nozzle 16 may be of various types well known in the art to deliver a conical spray of fuel axially into the combustion chamber. The fuel nozzles in these preferred embodiments are placed in an alternate arrangement wherein the vortex generators 20 which do not possess a fuel nozzle have on each side placed thereon a vortex generator 20 having a fuel nozzle 16. It is to be understood that any general arrangement of fuel nozzles is to be embodied within the concept of this invention, provided that two vortex generators 20 placed alongside of each other in a circumferential arrangement do not both possess fuel nozzles 16.

Referring again to FIG. 1, the burning or combustion characteristics of the combustion chamber 10 are dependent upon the establishment of discrete air flow patterns developed by the combination of air admitted through vortex generators and openings in liner 11. As noted, liner 11 includes a plurality of circumferential rows of openings 24 about the outer periphery and 26 about the inner periphery. These openings are provided with a lip or channel surfaces 28 which provide directional stability to air passing therethrough. The vortex generators 20 provide a vortical movement of fuel and air into the liner.

Your attention is directed to FIG. 5 which graphically depicts the controlled pattern air and the mixing characteristics of the invention. All three vortices 20' and 20" depicted in FIG. 5 have openings 30 for the inlet of air. Vortices 20' have contained therein fuel nozzles 16 for spraying fuel in the combustion chamber. Due to vortex 20", the controlled pattern of air depicted by the arrows thoroughly mixes the fuel dispersed by the fuel nozzles 16 and the air entering through openings 30. The air stream emanating from the vortices are caused to impinge on each other with a great degree of shearing action thereby causing the mixing action.

Accordingly, it is understood that by means of this invention, the optimum features of a combustion chamber utilizing a vortex generator air delivery has been accomplished. The combination of the vortex providing air together with the vortex providing air and fuel creates an optimum and controlled combustion in a discrete air-fuel pattern. It is important to note that the vortical patterns depicted by arrows in FIG. 5 are developed for fuel burning and that these patterns are not just rotating eddy masses. It is further important to note that this combination also maintains a complete combustion process closer to the head end. Thus, where transit time is very short, more time is given to the combustion process for a more complete combustion.

What is claimed as new and is desired to secure by Letters Patent of the United States is:

1. A perforated annular combustion liner having a closed head and an open exhaust, said combustion liner further comprising:

a plurality of vortex generator means circumferentially spaced in said head for providing air inlets, each said vortex generator means comprising a structure having air openings defined by a plurality of vanes which are adapted to impart vortical motion to air passing thereover, said plurality of vortex generator means being adapted in combination to generate a plurality of vortices having parallel axes, and fuel injector means inserted into some but not all, of the vortex generator means, each said fuel injector means being located at the axial center of a said vortex generating means.

2. A combustion liner as defined by claim 1 wherein said fuel injector means are inserted into alternate of the air vortex generator means.

3. An apparatus as defined in claim 2 wherein said fuel injector means cooperate with the air vortex generators for providing rotating vortical patterns of the fuel-air mixture thereby thoroughly mixing the air and fuel.

4. A combustion liner as defined by claim 2 wherein each said vortex generating means comprises a cup-shaped shell having a plurality of vanes extending therefrom and adapted to impart vortical motion to air passing through said shell.

References Cited

UNITED STATES PATENTS

| | | | |
|---|---|---|---|
| 2,616,258 | 11/1952 | Mock | 60—39.74 |
| 2,867,982 | 1/1959 | Clarke | 60—39.74 |
| 2,851,859 | 9/1958 | Foure | 60—39.74 |
| 3,134,229 | 5/1964 | Johnson | 60—39.74 |

MARK M. NEWMAN, Primary Examiner

D. HART, Assistant Examiner

U.S. Cl. X.R.

60—39.65, 39.36